Oct. 16, 1928.

L. S. BESSONETT 1,687,823

FITTING FOR DRAINAGE OF LUBRICANTS FROM LUBRICANT CONTAINING CASES

Filed Jan. 27, 1925

Inventor
Leland S. Bessonett

By Lyon & Lyon
Attorneys

Patented Oct. 16, 1928.

1,687,823

UNITED STATES PATENT OFFICE.

LELAND S. BESSONETT, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

FITTING FOR DRAINAGE OF LUBRICANTS FROM LUBRICANT-CONTAINING CASES.

Application filed January 27, 1925. Serial No. 5,178.

This invention relates to a fitting adapted to be connected to the crank case of the engine of a motor vehicle, and is more particularly directed to such a fitting, that is especially adapted for installation or connection to a crank case, where it is necessary to replace or add to the crank case draining attachment as supplied by the motor vehicle manufacturer.

It is an object of this invention to provide a fitting so constructed that the same may be installed or connected to an engine crank case, differential casing, or change gear housing, at the lowest point of the lubricant reservoir provided in the engine, and which may be suited for connecting a discharge tube in fluid tight relation with the drain opening in the case for the removal of the lubricant from the crank case and all the sediment formed therein.

An object of this invention is to provide a fitting such that the road clearance will not be materially decreased by the attachment of the fitting.

An object of this invention is to provide a fitting that may be installed or connected to a motor vehicle engine in such a manner that any screen or baffle that may be present in the engine will not prevent the discharge of sediment or foreign matter which may be present in the lubricant.

An object of this invention is to provide a fitting that may be installed or connected to a motor vehicle lubricant reservoir in such a manner that the same will not interfere with the function of any part or system of the motor vehicle to which it is attached. An object of this invention is to provide a fitting for attachment to the reservoir of a motor vehicle engine, which installation may be performed by inexperienced persons and at the same time will not produce any additional liability to oil leakage.

An object of this invention is to provide a fitting adapted to be connected to the oil reservoir of a motor vehicle engine where it is necessary to replace or add to the crank case drainage attachment supplied by the motor vehicle manufacturer.

Further objects of this invention will be apparent from the following detailed description of a preferred detailed embodiment thereof as illustrated in the accompanying drawings:

Figure 1:
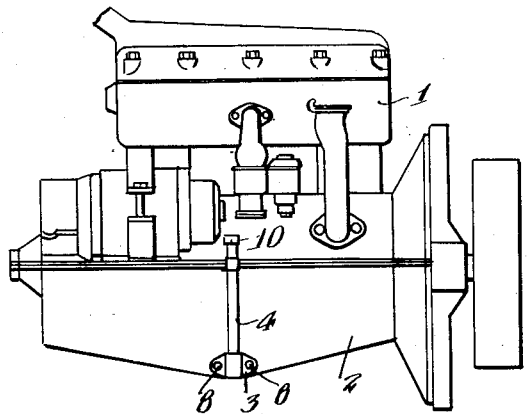
Fig. 1 is a side elevation of a motor vehicle engine illustrating a drainage fitting, in end elevation, embodying this invention attached thereto.
Figure 2:
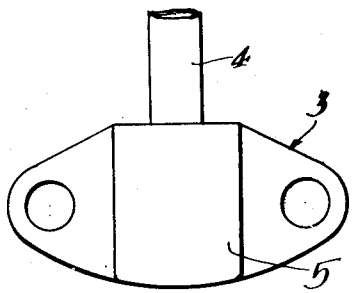
Fig. 2 is an enlarged end elevation of the drainage fitting illustrated in Fig. 1, illustrating the discharge conduit or tube broken away.
Figure 5:
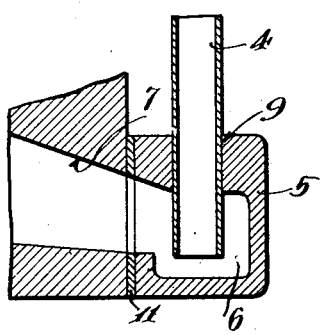
Fig. 5 is a central sectional side elevation of the fittings illustrated in Fig. 2.
Figure 3:
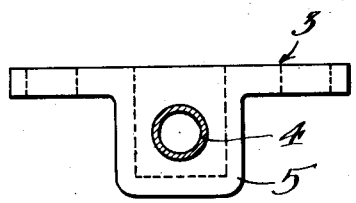
Fig. 3 is a top plan view thereof.
Figure 4:
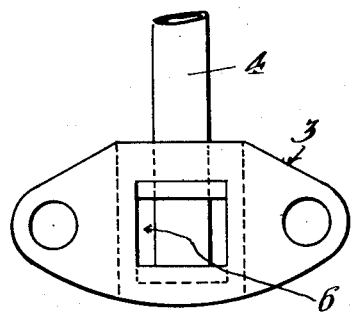
Fig. 4 is a rear end elevation of a fitting illustrated in Fig. 2.

In the drawing, 1 illustrates a motor vehicle engine of a common type, in which the lowest point of the oil reservoir is in the crank case 2. A fitting 3 is illustrated as attached thereto for connecting a discharge or eduction tube 4 in fluid tight relation with the lowest point of the said crank case 2, so that the oil may be discharged from the oil reservoir by means similar to that illustrated in the copending application of Henry D. Collier for system and apparatus for discharging lubricant from motor vehicles, filed February 9, 1924, Serial No. 691,861, now Patent No. 1,609,697.

The fitting 3 comprises a casing 5 providing a lubricant chamber or sump 6 to facilitate a complete draining of substantially all the lubricant and sediment from the oil reservoir or crank case 2. The casing 5 is secured in position over the drainage outlet 7 of the crank case 2 by means of cap screws 8 or similar holding devices, so that the drainage opening 7 will be in direct communication with the reservoir 6. An eduction tube 4 is passed through and rigidly secured within a bore 9 in the upper portion of the casing 5, the said eduction tube 4 extending into the chamber or sump 6 to a point near the bottom thereof. The tube 4 may be braised, welded, or otherwise secured to the casing 5.

The sump 6 has its lower portion at a point below the lowest point of the reservoir or crank case 2 and the tube 4 terminates at a point substantially level with the lowest point of the lubricant crank case 2, leaving a space between the end of the tube 4 and the lowest point of the sump 6 to enable a complete or substantially complete discharge of all lubricant and sediment therethrough.

The discharge tube 6 terminates at its opposite end at a point above the normal level of the oil in the case 2, and is provided with a dust cap 10. A gasket or packing ring 11 is interposed between the casting 5 and the case 2 so as to provide a fluid tight connection.

Having fully described a preferred embodiment of this invention, it is to be understood that it is not intended to limit the same to the exact construction herein set forth, which may obviously be varied in detail without departing from the spirit of the appended claims.

I claim:

1. The combination of a lubricant containing case having a side drainage outlet, a fitting secured to the case over the said outlet and having an interior chamber providing a sediment receiving sump, and a vertically extending suction tube rigidly secured to the said fitting and extending into the said sump.

2. The combination of a lubricant containing case having a side drainage outlet near the lowest point of the said case, a fitting secured to the said case in fluid tight relation over the said outlet and having a chamber providing a sediment receiving sump below the said opening, and a vertically extending suction tube rigidly secured to the said fitting and extending into the said sump.

Signed at San Francisco, Calif., this 17th day of January, 1925.

LELAND S. BESSONETT.